(12) United States Patent
Clement

(10) Patent No.: US 7,467,566 B2
(45) Date of Patent: Dec. 23, 2008

(54) ANTI-BACKLASH DEVICE IN A GEAR

(75) Inventor: Phillipe Clement, Penthalaz (CH)

(73) Assignee: Bobst S.A. (CH)

( * ) Notice: Subject to any disclaimer, the term of this patent is extended or adjusted under 35 U.S.C. 154(b) by 685 days.

(21) Appl. No.: 10/996,486

(22) Filed: Nov. 24, 2004

(65) Prior Publication Data

US 2005/0109144 A1 May 26, 2005

(30) Foreign Application Priority Data

Nov. 25, 2003 (CH) .................................. 02008/03

(51) Int. Cl.
*F16H 55/18* (2006.01)

(52) U.S. Cl. .............................. 74/409; 74/444; 74/432; 74/439

(58) Field of Classification Search ................... 74/409, 74/440, 444, 451, 431, 432, 439
See application file for complete search history.

(56) References Cited

U.S. PATENT DOCUMENTS

| | | | |
|---|---|---|---|
| 2,966,806 A | 1/1961 | Luning | |
| 3,035,454 A | 5/1962 | Luning | 74/440 |
| 4,055,092 A * | 10/1977 | Aberg | 74/439 |
| 4,114,470 A * | 9/1978 | Sharpe | 74/441 |
| 4,660,432 A | 4/1987 | Damas | 74/440 |
| 5,931,052 A * | 8/1999 | Zhao et al. | 74/574.4 |
| 6,148,684 A | 11/2000 | Gardiner | |
| 6,826,975 B2 * | 12/2004 | Reguzzi | 74/440 |

FOREIGN PATENT DOCUMENTS

| | | |
|---|---|---|
| DE | 9207637 U | 10/1992 |
| EP | 1 034 923 B1 | 9/2000 |
| FR | 473246 | 1/1915 |
| JP | 10-306867 | 11/1998 |
| WO | WO 98/46896 | 10/1998 |

OTHER PUBLICATIONS

International Search Report dated Apr. 16, 2004.

* cited by examiner

*Primary Examiner*—David M Fenstermacher
(74) *Attorney, Agent, or Firm*—Ostrolenk, Faber, Gerb & Soffen, LLP

(57) ABSTRACT

A driving element is divided into two coaxial toothed members elastically attached to one another. A first of the toothed members is fixed to a shaft. The second of the toothed members is freely mounted on this shaft. The second toothed member has a planar face, opposite and facing away from the first toothed member. That face has seats arranged around the shaft to receive first respective ends of deflection rods. The rods extend, with the shaft, outside of the toothed member. A flange has an axial passage for receiving an end of the shaft. The flange has seats for receiving second respective ends of the deflection rods. A device for clamping the flange on the end of the shaft and in an angular position around the shaft fitted to apply a deflection stress to the rods.

8 Claims, 2 Drawing Sheets

ANTI-BACKLASH DEVICE IN A GEAR

BACKGROUND OF THE INVENTION

The present invention refers to a anti-backlash device in a gear in which a toothed driving element is divided into two coaxial toothed members attached to one another by elastic means adapted to create a torque between these two coaxial toothed members.

Many solutions have already been proposed to eliminate backlash in a gear. For example, in the solution proposed in U.S. Pat. No. 4,660,432, a driving gear meshes with a driven gear fixed on a shaft and associated with two wheels arranged on both sides of the driving gear. The wheels are linked to the driving gear by prestressed elastic blocks ensuring an angular displacement between the driving gear and the two associated wheels. Such a device requires three wheels, and the presence of elastic blocks crossing two of the wheels does not allow using wheels or gears of small diameter, capable of transmitting a high torque, because the presence of holes weakens the board of the wheel, so that an adequate space has to be left between the edge of the holes and the bottom of the toothing. Due to this, the minimum diameter of the wheel is substantially increased.

Another anti-backlash device is described in U.S. Pat. No. 3,035,454, in which the elastic linking means between two coaxial wheels extend in the radial direction. Again, relatively large openings have to be recessed in one of the wheels to enable rods perpendicular to the board of one wheel to cross the other wheel so as to mesh with the radial elastic linking means, fixedly attached to the other wheel. These openings weaken the wheel and do not allow use of a wheel of small diameter. The length of the elastic linking arms is also limited by the radius of the wheel.

Another anti-backlash device is described in EP 1,034,923. It has similar features to the above mentioned solutions. In addition, this device does not allow adjusting the prestressing in accordance with the torque to be transmitted but allows only one determined stress.

SUMMARY OF THE INVENTION

The object of the present invention is to at least partly overcome the above-mentioned drawbacks.

To this end, the present invention relates to an anti-backlash device in a gear. A driving element is divided into two coaxial toothed members elastically attached to one another. A first of the toothed members is fixed to a shaft. The second of the toothed members is freely mounted on this shaft. The second toothed member has a planar face, opposite and facing away from the first toothed member. That face has seats arranged around the shaft to receive first respective ends of deflection rods. The rods extend, with the shaft, outside of the toothed member. A flange has an axial passage for receiving an end of the shaft. The flange has seats for receiving second respective ends of the deflection rods. A device for clamping the flange on the end of the shaft and in an angular position around the shaft is fitted to apply a deflection stress to the rods.

The present invention has a plurality of advantages. The most important is unquestionably the fact that the deflection rods extend only from one side of the second toothed member, so that they do not have to cross it. Thus, this toothed member is not weakened.

Advantageously, the face of the second toothed member, on which the seats of the second ends of the deflection rods open, is at an axial distance from the adjacent edge of the toothing of the second toothed member, at least equal to the axial length of these seats.

Preferably, the seats are arranged in a flange which is fixedly attached to the second toothed member and which may have another diameter, particularly larger than the diameter of the second toothed member. This offers new technical possibilities with respect to known devices.

Another advantage of the present invention results from the length of the bars not being limited by the dimensions of the toothed members, as in prior art devices. Now, the longer are the bars, the less the value of the prestressing exerted by the bars changes when variation of the distance between the axles occurs. Due to this, the present invention is not restricted to a fixed axle distance. Since the backlash varies according to the axle distance and the more the deflection bars are extended, then the less the prestressing varies according to the axle distance variation, and an approximately constant prestressing force for different axle distances is possible. This is not the case with devices in which the length of the prestressing springs is limited by the dimension of the wheels. Due to this fact, the torque transmittable by the gear using the anti-backlash device of the present invention practically does not vary according to the backlash to be eliminated.

The enclosed drawings illustrate, schematically, an exemplary embodiment of the anti-backlash device of the present invention.

BRIEF DESCRIPTION OF THE DRAWINGS

FIG. 3 is a view according to section III-III of FIG. 2, and showing the tool adapted to prestress the device.

DESCRIPTION OF A PREFERRED EMBODIMENT

An anti-backlash device according to the present invention comprises a shaft 1 fixedly attached to a first toothed member 2. Although only two of the teeth are shown in the Figures, this is a conventional gear toothed around its entire circumference. The shaft 1 is elongated by a part 1*a*, with which the anti-backlash members of the gear are associated.

Figure 2:
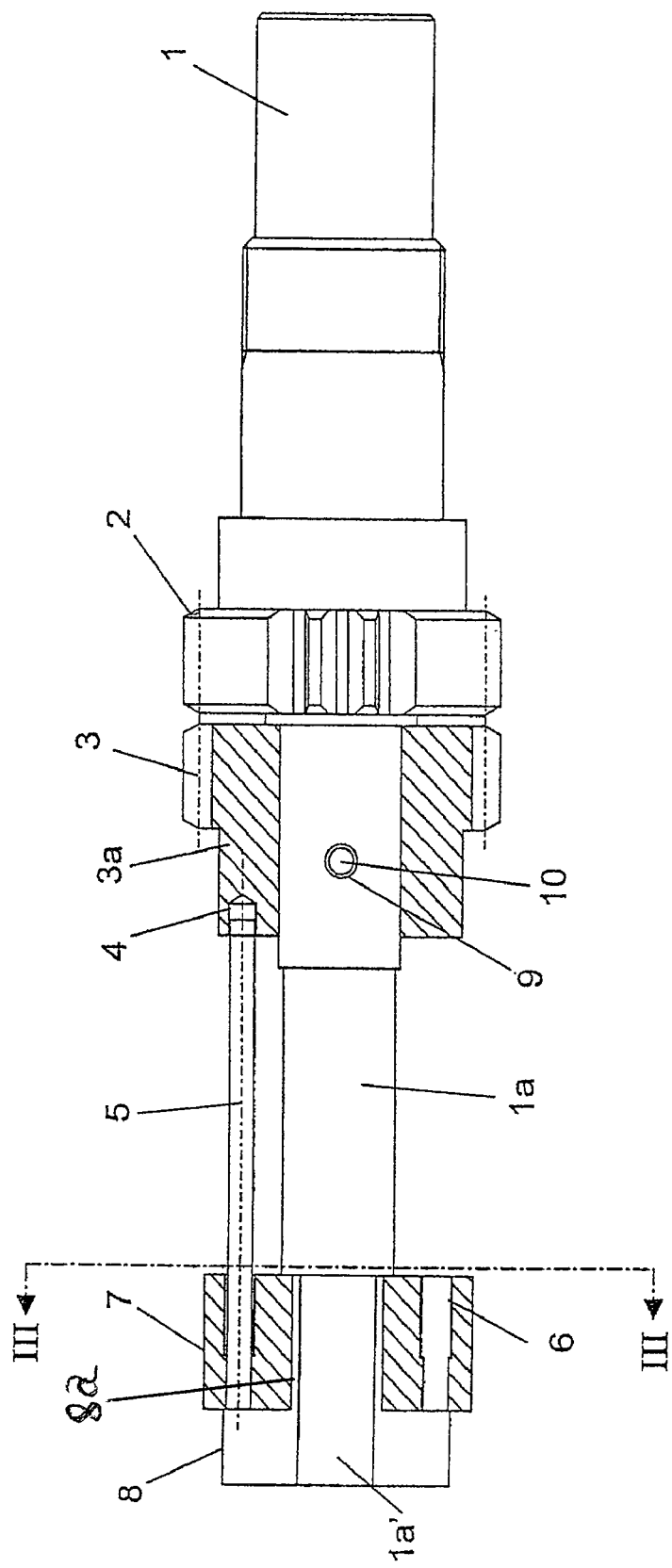
FIG. 2 is a partial sectional view of FIG. 1.

The first one of the members is a second toothed member 3, having toothing illustrated as identical to the toothing of the first toothed member 2. In this example, the second toothed member 3 comprises a non-toothed part 3*a*, on the side opposite to the first toothed member 2. A series of seats 4, of which only one is shown in FIG. 2, open on the planar face turned outward toward the exterior of the second toothed member 3. In this example, the seats 4 extend along a radially lower depth than the axial length of the non-toothed part 3*a* of the second toothed member 3. Due to this location, the seats 4 do not weaken the toothed part of the second toothed member 3, which is adapted to transmit a possibly considerable torque to a driven toothed member (not shown), which has to mesh with the toothed member 3. It is to be noted in the illustrated example, that the non-toothed part 3*a* is part of the same piece as the toothed member 3. It is also possible to form the non-toothed part 3*a* on another piece which would be fixedly attached to the toothed member 3. Thus, it would be possible to have a toothed part 3 with a smaller diameter than the non-toothed part 3*a*.

Each seat 4 receives an end of a deflection rod 5, and the seats and the rods 5 are regularly distributed on a circle that is concentric with the part 1a of the shaft 1. At their ends, the deflection rods 5 are each received in a seat 6 arranged in a flange 7. Like the non-toothed part 3a, which is fixedly attached to the second toothed member 3, the seats 6 are arranged on a circle that is concentric with the part 1a of the shaft 1.

Figure 1:
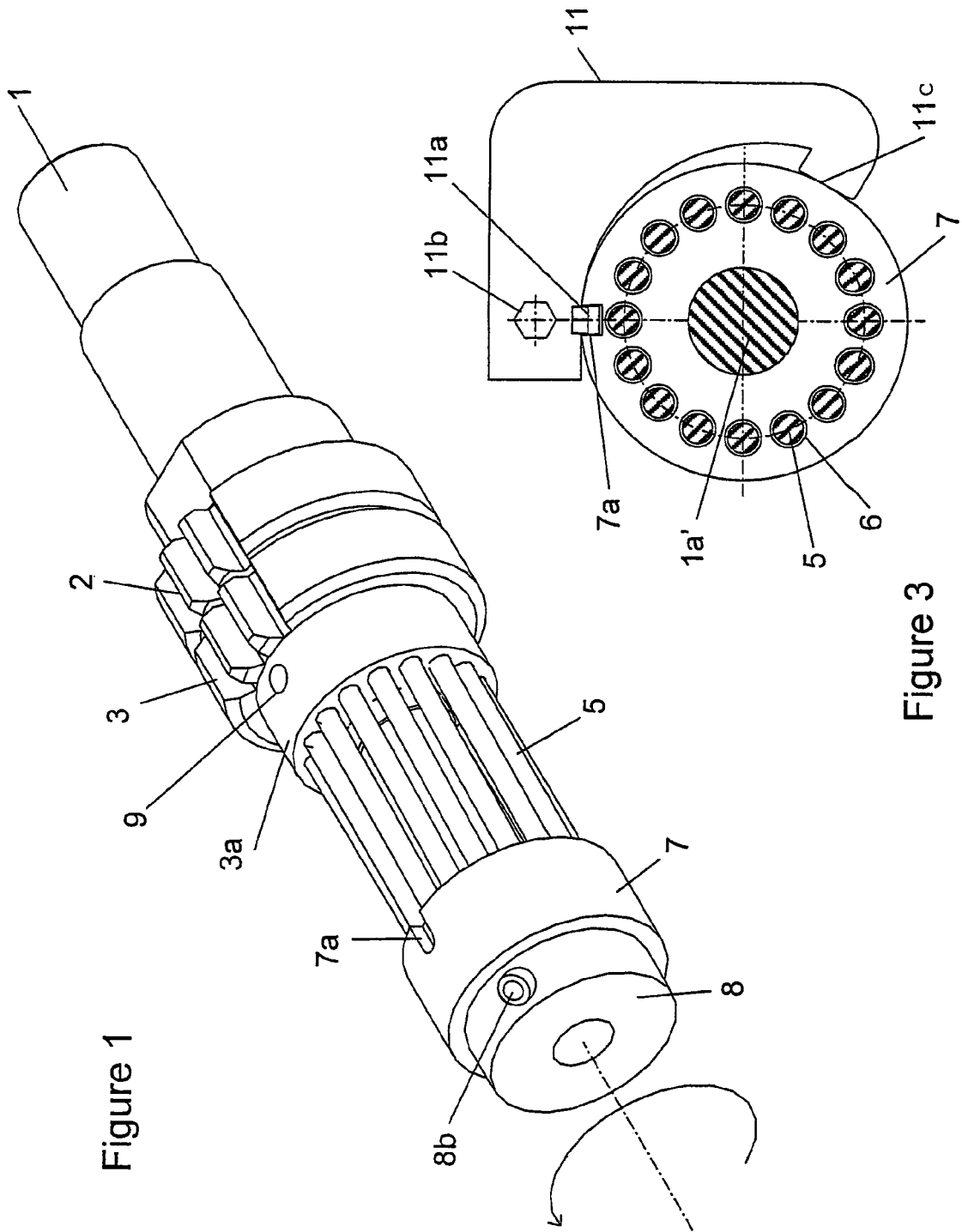
FIG. 1 is a perspective view of an embodiment of the invention.

The flange 7 has also a central opening. This opening, however, does not directly receive the end 1a' of the part 1a of the shaft 1. An expansible tubular part 8a of a clamping member 8 is interposed between the central opening of the flange 7 and the end 1a' of the part 1a of the shaft 1. Advantageously, this clamping member is a friction coupling with hydraulic expansion of a known type, such as described in WO 98/46896 and marketed by the ETP Transmission AB Company, Linköping Sweden. It will not be further described nor shown in detail here. Inside the tubular part 8a, the clamping member 8 has a slim annular chamber communicating with a space in the larger diameter part of the clamping member 8, adjacent to the external face of the flange 7. The volume of the inner space and the annular chamber is filled with a liquid. A screw 8b, shown in FIG. 1, provided with sealing means, is screwed in the part of larger diameter of the clamping member 8 and communicates with the inner space arranged therein. By screwing the screw 8b, the volume of the inner space filled with liquid is reduced, so that the liquid is pressurized and the tubular part 8a of this clamping member 8 inflates, thereby fixedly attaching the flange 7 around the end 1a' of the shaft 1.

In order to adjust the prestressing of the deflection rods 5 without having to mesh the toothed members 2, 3 with a driven toothed wheel, and so that the prestressing on the anti-backlash device can be adjusted before mounting it in a gear train, a radial bore 9 is provided in the non-toothed part 3a which is fixedly attached to the second toothed member 3. A radial pin 10, of smaller diameter than the bore 9, is fixed in the part 1a of the shaft 1. The radial backlash between the pin 10 and the bore 9 is chosen with respect to the backlash to be eliminated. When the deflection rods 5 are not prestressed, the toothings of the two toothed members 2 and 3 are in perfect alignment and the pin 10 is concentric in the bore 9.

FIG. 3 shows a tool 11, of the pin wrench kind. It is used for applying a deflection prestressing between the flange 7, which flange can be fixedly attached to the shaft 1, 1a due to the clamping member 8 and thus the flange can be fixedly attached to the first toothed member 2 on the one hand and the second toothed member 3 which has a certain degree of freedom with respect to the first member on the other hand. The tool 11 has a lug 11a which engages in a notch 7a of the flange 7. An arm has an end 11c that rests against the circumference of the flange 7 and has a hexagonal opening 11b adapted to receive a torque wrench (not shown).

The anti-backlash device can be prestressed before being mounted. To this aim, the shaft 1 must be fixed in a chuck (not shown). Then, a torque wrench is introduced into the hexagonal opening 11b and a determined torque is applied to the flange 7. This causes an S-shaped deflection of each deflection rod or bar 5. This torque is greater than the highest torque to be transmitted by the anti-backlash device according to the invention. Then, the screw 8b of the clamping member 8 is screwed until the pressure exerted by the liquid at the interior reaches a determined value, chosen so that the frictional force between its tubular part 8a and the end 1a' of the shaft 1 on the one hand and the flange 7 on the other hand is greater than the torque to be transmitted.

Thus, the deflection bars 5 exert a determined prestressing between the two toothed members 2, 3. This prestressing is adapted to eliminate the backlash between the two toothed members 2, 3 and the driven wheel (not shown) and to transmit between these driving toothed members 2, 3 and the driven wheel, a torque less than the prestressing, thus ensuring the anti-backlash during the torque transmission.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. Anti-backlash device in a gear comprising:
    a toothed driving gear element comprising two coaxial and toothed members; an elastic attachment being between the toothed members and being adapted to create a torque between the toothed members;
    a drive shaft to which a first of the toothed members is fixedly attached; a second of the toothed members being freely mounted on the shaft, the second toothed member having a face, opposite and facing away from the first toothed member, the face having first seats arranged around the shaft;
    deflectable deflection rods having respective first and second ends; each of the first ends being received in one of the first seats, the deflection rods extending, along with the shaft, axially outside of the second toothed member away from the first toothed member;
    a flange spaced away from the face of the second toothed member, the flange including an axial passage for receiving the shaft, second seats in the flange arranged around the axial passage, the deflection rod second respective ends being received in the second seats; and
    a clamping device for clamping the flange on the shaft in an angular position around the shaft, the clamping device being fitted to apply to the rods an elastic deflection stress adjustable according to a desired torque between the toothed members,
    the deflection rods being operable to eliminate the backlash between the toothed members and a toothed wheel driven by the toothed members.

2. The device according to claim 1, wherein the face of the second toothed member is a planar face.

3. The device according to claim 1, wherein the shaft has an end away from the second toothed member and the end of the shaft is at the axial passage.

4. The device according to claim 2, wherein the planar face of the second toothed member is at an axial distance to an adjacent edge of toothing of the second toothed member that is at least equal to an axial length of the first seats for receiving the first respective ends of said deflection rods.

5. The device according to claim 2, further comprising a distinct member fixed on the second toothed member, and the seats for receiving the first ends of the deflection rods are arranged in the distinct member.

6. The device according to claim 5, wherein the distinct member fixed on the said second toothed member has an external diameter larger than an external diameter of the second toothed member.

7. The device according to claim 1, further comprising a device for fixing the second toothed member to the shaft.

8. The device according to claim 1, wherein the clamping device is a hydraulically operated clamping device.

* * * * *